United States Patent
Kuck et al.

(10) Patent No.: US 9,880,797 B2
(45) Date of Patent: *Jan. 30, 2018

(54) INTELLIGENT INTERFACE DISPLAY SYSTEM RELATING REAL-TIME DATA WITH COMPILED DATA

(71) Applicant: Daktronics, Inc., Brookings, SD (US)

(72) Inventors: Anthony Thomas Kuck, Brookings, SD (US); Jon Curtis Grann, Sioux Falls, SD (US); Samuel A. Martens, Arlington, SD (US); Casey M. Stout, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 475 days.

This patent is subject to a terminal disclaimer.

(21) Appl. No.: 13/765,985

(22) Filed: Feb. 13, 2013

(65) Prior Publication Data

US 2013/0150988 A1 Jun. 13, 2013

Related U.S. Application Data

(63) Continuation of application No. 12/080,953, filed on Apr. 8, 2008, now Pat. No. 8,400,436.

(Continued)

(51) Int. Cl.
*A63F 13/27* (2014.01)
*G06F 3/038* (2013.01)
(Continued)

(52) U.S. Cl.
CPC ............... *G06F 3/14* (2013.01); *H04H 60/06* (2013.01)

(58) Field of Classification Search
CPC .......................................................... G06F 3/14
(Continued)

(56) References Cited

U.S. PATENT DOCUMENTS 5,526,479 A 6/1996 Barstow et al.
5,653,634 A 8/1997 Hodges
(Continued)

OTHER PUBLICATIONS

"U.S. Appl. No. 12/080,953, Response to Restriction Requirements", 11 pags.

(Continued)

*Primary Examiner* — Omkar Deodhar
*Assistant Examiner* — Ross Williams
(74) *Attorney, Agent, or Firm* — Schwegman Lundberg & Woessner, P.A.

(57) ABSTRACT

A software application program that intelligently interfaces with a statistical data recording program, mass data storage devices and programmable electronic display devices to monitor the situational current state of a real-time event or activity such as a sporting contest and to identify, select, compile, organize, prioritize, present and recommend a plurality of relevant data items compiled from a plurality of recorded data sources to provide visual display content for selection by an operator for display on one or more electronic display boards. The intelligent interface software application program enables an operator of a programmable electronic display device instantly to review and select relevant data items corresponding to a given situational current state of a real-time event or activity and transmit selected data items for display on electronic display boards to a viewing party or public.

19 Claims, 5 Drawing Sheets

Related U.S. Application Data (60) Provisional application No. 60/922,820, filed on Apr. 11, 2007.

(51) Int. Cl.
 *G06F 3/14* (2006.01)
 *H04H 60/06* (2008.01)

(58) Field of Classification Search
 USPC .................. 463/30–33, 40–47; 345/204–205
 See application file for complete search history.

(56) References Cited

U.S. PATENT DOCUMENTS

| | | | |
|---|---|---|---|
| 5,671,347 A | | 9/1997 | Barstow et al. |
| 6,204,862 B1 | | 3/2001 | Barstow et al. |
| 7,373,587 B1 | | 5/2008 | Barstow et al. |
| 2002/0015060 A1* | | 2/2002 | Honjas ........................ 345/748 |

OTHER PUBLICATIONS

"U.S. Appl. No. 12/080,953, Non Final Office Action dated Jan. 4, 2012", 9 pgs.
"U.S. Appl. No. 12/080,953, Non Final Office Action dated Jul. 23, 2012", 9 pgs.
"U.S. Appl. No. 12/080,953, Notice of Allowance dated Dec. 7, 2012", 5 pgs.
"U.S. Appl. No. 12/080,953, Response filed Apr. 4, 2012 to Non Final Office Action dated Jan. 4, 2012", 17 pgs.
"U.S. Appl. No. 12/080,953, Response filed Nov. 20, 2012 to Non Final Office Action dated Jul. 23, 2012", 10 pgs.
"U.S. Appl. No. 12/080,953, Restriction Requirement dated Oct. 4, 2011", 5 pgs.

\* cited by examiner

INTELLIGENT INTERFACE DISPLAY SYSTEM RELATING REAL-TIME DATA WITH COMPILED DATA

CLAIM OF PRIORITY

This application is a continuation of and claims the benefit of priority under 35 U.S.C. §120 to U.S. patent application Ser. No. 12/080,953, filed on Apr. 8, 2008, which claims the benefit of priority under 35 U.S.C. §119(e) to U.S. Provisional Patent Application Ser. No. 60/922,820, filed on Apr. 11, 2007, the benefit of priority of each of which is claimed hereby, and each of which are incorporated by reference herein in its entirety.

BACKGROUND OF THE INVENTION

Field of the Invention

The present invention is a software application program that interfaces with a statistical data recording program to provide an operator with selected data items compiled from multiple recorded data sources relevant to a given situational current state of a real-time event or activity.

More specifically, the present invention is a software application program that embodies an intelligent interface between a statistical data recording program and a plurality of recorded data sources that is operatively equipped to intelligently identify, select, organize, prioritize, present and recommend data items relevant to a given situational current state of a real-time event or activity. Compiled relevant data items are presented to an operator of the intelligent interface program within a graphical user interface (GUI) to enable the operator to quickly and easily select one or more relevant data items from a list or table for instantaneous display on an electronic display board for viewing by a viewing party or public. Compiled relevant data items presented by the intelligent interface program and selected for display by an operator may include statistical data, text messages, visual and textual digital graphics, and similar such data.

DESCRIPTION OF THE PRIOR ART

Electronic display boards, such as sports scoreboards, are known in the art. Display board operators typically present textual and graphical information on electronic display boards during real-time events and activities such as sporting contests for viewing by a viewing party or public, thereby to provide information that heightens, enhances or informs the experience of the event.

Statistical data recording application programs also are known in the art. Application programs of this kind typically are used to record statistical information relating to real-time events and activities such as sporting contests. Recorded statistical data created or modified using statistical data recording programs typically is maintained in one or more electronic databases that are continually updated as new statistical data is generated. By way of example, statistical databases for a baseball league might include league standings, team standings, team statistics, player statistics and box scores of games.

In real-time events or activities such as professional sports, electronic display boards such as sports scoreboards are used to display current information about a sports contest or game such as the game clock, the game period, the current score, the current state of play, and similar such information. Typically, electronic display boards at professional sporting events also are used to enhance the experience of patrons by displaying information relevant to the situational current state of a game in progress, such as statistics for a given team or player or contestants, text messages providing items of interest or information to viewers and similar information. For example, a situational current state of a real-time event such as a baseball game might be a match-up between a particular pitcher and a particular batter. Information relevant to this particular situational current state might include the batter's seasonal batting average against the pitcher, the batter's career batting average against left-handed pitchers, the batter's home games batting average versus away games, the pitcher's earned-run average against both the particular batter and the batter's team, and so forth. Additional situational information may include contestant or team standings, player career statistics, historical information relating to previous contests between the two teams, and leaders in specific skill categories.

By way of providing this information, an operator of an electronic display board must consult multiple data sources, which may include paper materials such as reference books, press guides, sports journals and similar sources, or may be hardcopy printed reports taken from digital data sources such as electronic databases and Internet websites. A large number of such sources may be available to the operator of an electronic display board and may contain a large amount of statistical information. When such data is available from digital data sources, the operator still must consult multiple screens or get printed reports from each source to get a good overview of the relevance of the data. Moreover, relevant data may not be easy to find and may not be easily viewed once found, particularly if data is contained in dense matrix tables and complex data charts. Browsing through multiple websites or a large number of printed information sources quickly and efficiently to identify data items relevant to a given situational current state of a real-time event or activity such as a sporting contest is a difficult and frustrating task, particularly when the situational current state can change instantly and without warning, making any identified and selected data no longer relevant. Furthermore, once relevant data items are identified and collected, it takes time to identify and select those that are most appropriate to a given situational current state and additional time to perform the actions necessary to convert or transcribe selected data items for display on an electronic display board for viewing. Finally, the outcome of using these methods frequently is subject to error.

To overcome these shortcomings, information in multiple data sources is compiled and organized prior to a sporting contest by data analysts who attempt to predict possible situational states that might occur and produce statistical tables and reports that will apply. Typically, a large body of information sources is available for use that must be manually reviewed, analyzed and organized for predicted needs. For the sake of efficiency, data analysts first establish minimum requirements that any data item must meet to be considered a candidate for inclusion. Analysts then identify the key data items within a larger body of relevant data items at their disposal that meet these requirements. The data then must be organized and categorized in a manner that allows efficient access for selection and display when situational states occur during a real-time event, such as a sporting contest, since any opportunity to relevant data items may quickly expire.

While these efforts are useful for condensing a large amount of available information in multiple data sources into a more manageable form; they also are time-intensive and labor-intensive. In addition, they do not address the problem of having to quickly identify data items relevant to a given situational current state of a real-time event or activity and quickly convert or transcribe them into a form suitable for presentation on an electronic display board before the situational current state expires and the period of opportunity is lost. The operator of an electronic display board must identify from the relevant data items compiled by data analysts those data items that are most appropriate to the situational current state of a real-time event or activity from potentially hundreds of statistical categories of data and then quickly convert or transcribe the chosen data items for display.

Since it is difficult to anticipate the many types of situational current states that might occur during a real-time event or activity, such as a sporting contest, and since situational current states can change very quickly, the type of relevant data items that are displayed for viewing on electronic display boards is often limited to the more mundane or broadly applicable data that is readily available and easy to present within the limited time available. Interesting and telling information that would enhance the experience of viewers, such as patrons and contestants of a sporting contest, typically is under-utilized or abandoned as a result of the inefficiencies of the prior art. Furthermore, any work that data analysts produce prior to a real-time event or activity such as a sporting contest may be compromised or devalued by unanticipated changes, such as player substitutions or injuries, changes in the batting line-up, or simply due to human error in the selection criteria.

In summary, the prior art is generally dependent on conventional means, such as manually compiled paper records and printed reports, to provide operators of electronic display boards with relevant data items for display relating to a given situational current state of a real-time event or activity. As a result, access to relevant data items corresponding to a given situational current state is slow and inefficient, opportunities to display relevant data items for timely viewing within an ephemeral period are limited; precompiled data by data analysts is time-consuming and costly to produce and subject to error; outcomes may become inapplicable or quickly obsolete, and the variety of relevant data items available for display is limited by the collective shortcomings of a deficient process. A novel approach to address these and other deficiencies of the prior art is needed to continue to satisfy public demand and thereby ensure continuing development of the art.

Means and methods novel and efficacious must embody automated tools that: (1) automatically generate and present compiled data items relevant to a given situational current state of a real-time event or activity; (2) automatically designate or recommend the most appropriate compiled data items based on predetermined minimum selection criteria or threshold values; (3) provide a preview of relevant compiled data items to enable an operator to choose the data items most appropriate to a given situational current state quickly and easily and to transmit chosen data items to an electronic display board for instantaneous display; (4) provide means to enable an operator to preview and select from a list of text messages for display and to create, edit and prioritize text messages in real-time; and (5) provide means for an operator to view data from other data sources independent of a given situational current state such as league statistics, team statistics and player statistics.

SUMMARY OF THE INVENTION

The present invention addresses and resolves the aforementioned deficiencies of the prior art by providing novel means and methods to identify, select, compile, organize, prioritize, present and recommend factual, statistical, textual, graphical and other types of recorded data taken from a plurality of data sources for use by operators of electronic display boards such as sports scoreboards to present to a viewing party or public selected data items relevant to a given situational current state of a real-time event or activity such as a sporting contest.

More specifically, the present invention embodies a software application program that operatively executes the tasks of identifying, selecting, compiling, organizing, prioritizing, presenting and recommending relevant data items compiled from a plurality of recorded data sources in response to real-time data representing situational current states occurring during real-time events and activities such as sporting contests.

According to a preferred embodiment of the present invention, there is provided a software application program that embodies an intelligent interface between a sport statistics recording program and a plurality of recorded data sources to continuously monitor the situational current state of a real-time event or activity such as a sporting contest, sort through said plurality of recorded data sources for data items relevant to a given situational current state, organize and prioritize the selected relevant data items, designate or recommend a sub-set of the most appropriate data items based on predetermined minimum selection criteria or threshold values, and present a compilation of relevant data items for review, selection and display by an operator. The software application program of the present invention includes software controls for setting nominal or minimum selection criteria, or threshold values, for designating or recommending for display the most appropriate relevant data items corresponding to a given situational current state of a real-time event or activity as selected from all relevant data items compiled from multiple recorded data sources. By way of example, minimum acceptance criteria might include only data items that relate to two teams about to engage in a forthcoming sporting contest, only data items that apply to current players of the selected teams, only data items for player and team statistics less than five years old, and so forth.

The software application program of the present invention presents compiled relevant data items corresponding to a given situational current state within a single selection field such as a computer monitor screen. The program operator thereby is enabled to quickly and efficiently choose one or more relevant data items for display and instantaneously transmit selected data items to an electronic display board for viewing. As compared to prior art means and methods, there is virtually no delay in the presentation of relevant data items corresponding to a given situational current state and the transmitting of selected relevant data items to an electronic display board for viewing. When a given situational current state expires and is replaced by a subsequent situational current state, the software application program of the present invention senses the change and automatically revisits recorded data sources and presents a new selection of compiled relevant data items corresponding to the new situational current state. Thus, the software application program of the present invention eliminates the time-intensive and labor-intensive manual work of data analysts, reduces or eliminates human error, and enables operators to effectively access and utilize a large amount of recorded data during a real-time event or activity for selection and display on an electronic display board.

In alternative embodiments, the software application program of the present invention may be modified to serve as an intelligent interface applied to various and disparate real-time events or activities other than sporting contests, where a plurality of recorded data sources and real-time situational current states of an event or activity provide basis for conjoining by intelligent interface, thereby to compile from said plurality of recorded data sources a selection of relevant data items corresponding to a given situational current state for presentation to an operator for review, selection and display on an electronic display board.

A significant aspect and feature of the present invention is the software application program embodies an intelligent interface between a sport statistics recording program, a plurality of recorded data sources containing relevant data items including statistical data, and an electronic display board.

Another significant aspect and feature of the present invention is the software application program intelligently monitors a given situational current state of a real-time event or activity and presents data items relevant to said situational current state for review and selection by an operator for display on an electronic display board.

Another significant aspect and feature of the present invention is the software application program enables an operator to select data items relevant to a given situational current state previously compiled and organized and to instantly transmit selected relevant data times to an electronic display board for display.

Another significant aspect and feature of the present invention is the software application program prequalifies a sub-set of relevant data items compiled and presented to an operator as data items most appropriate for display by discriminating between those relevant data items that meet predetermined minimum selection criteria or threshold values and those data items that do not.

Another significant aspect and feature of the present invention is the software application program automatically senses a change in real-time data representing a situational current state of a real-time event or activity and automatically recompiles relevant data items selected from a plurality of data sources and presents recompiled relevant data items to an operator for display.

Another significant aspect and feature of the present invention is the software application program allows an operator to select any one or a plurality of relevant data items from a single field or screen of compiled relevant data items and to instantaneously transmit selected relevant data items to an electronic display board for display.

Another significant aspect and feature of the present invention is the software application program provides a text message preview capability that enables an operator to preview individual text messages from a compiled list of text messages before transmitting any message for display on an electronic display board. The software application program of the present invention further enables an operator to create, edit and delete text messages in real-time.

Another significant aspect and feature of the present invention is the software application program provides means for an operator to view recorded data sources independent of the recorded data sources used to compile data items relevant to situational current states such as league statistics, league standings and historical data.

A significant advantage of the present invention is that data search, selection, analysis, compilation, organization, prioritization and presentation are done by the software application program rather than being done manually by human workers thus reducing costly time and effort in generating useful and relevant data items for display.

Another significant advantage of the present invention is that data items compiled from a plurality of recorded data sources relevant to a given situational current state of a real-time event or activity are identified, selected, compiled, organized, prioritized and presented automatically and instantaneously.

Another significant advantage of the present invention is that the software application program eliminates the time- and labor-intensive manual processes done by human data analysts of searching, reviewing, identifying, sorting, organizing, compiling, prioritizing and presenting data items predictive of potential situational current states of a real-time event or activity.

Having thus described embodiments of the present invention and set forth significant aspects and features, it is a principal object of the software application program of the present invention to enable an operator or operators to select and compile from recorded data sources relevant data items corresponding to a given situational current state of a real-time event or activity and to transmit selected relevant data items to one or more electronic display boards for viewing by a viewing party or public, thereby to heighten, enhance or inform the experience and enjoyment of the viewers or patrons of the event. It is a further principal object of the software application program of the present invention to significantly reduce or eliminate the time-intensive and labor-intensive work by human data analysts, thus resulting in a savings of time and cost in accomplishing the same results.

BRIEF DESCRIPTION OF THE DRAWINGS

Other objects of the present invention and many of the attendant advantages will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
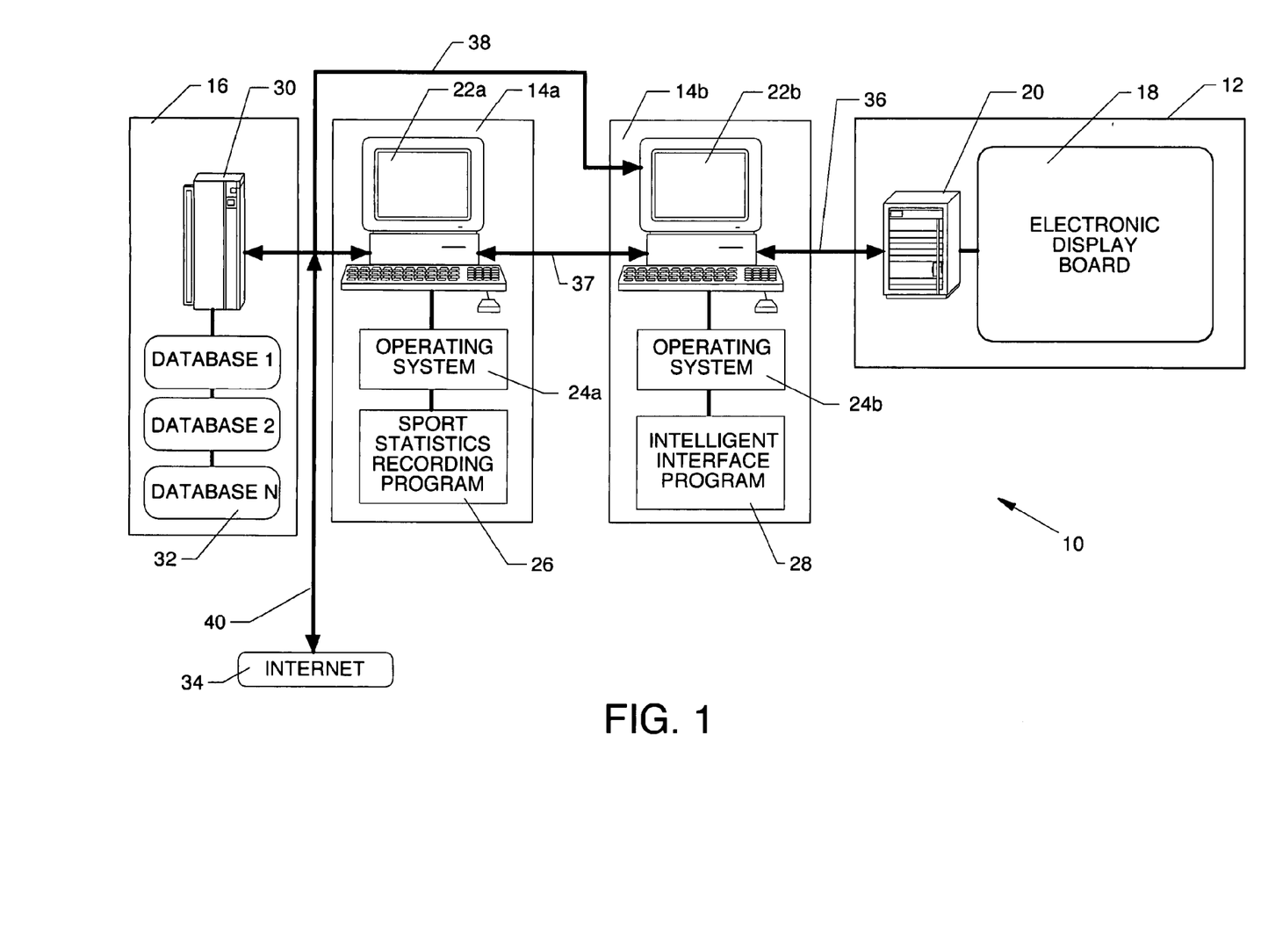
FIG. 1 is a conceptual diagram depicting in general overview the software application program of the present invention providing intelligent interface between a sport statistics recording program and a plurality of recorded data sources together with an electronic display board system.
Figure 2:
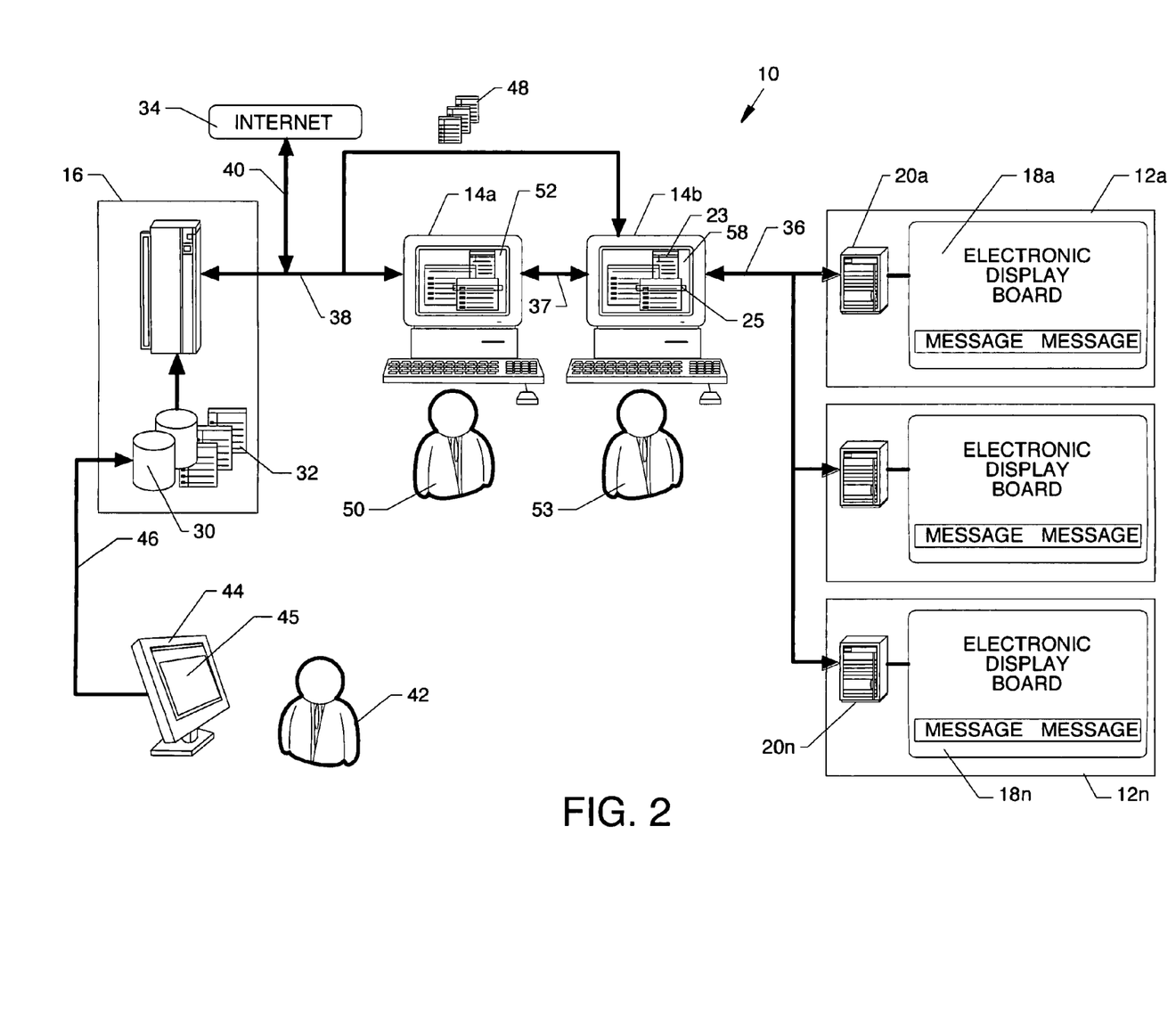
FIG. 2 is a conceptual diagram depicting the input data, output data and data flow of data sources used by the intelligent interface software application program of the present invention.

Referring to the figures, and in particular to FIGS. 1 and 2, an intelligent interface display system 10 that embodies use of the intelligent interface software application program of the present invention is shown. In a preferred embodiment, intelligent interface display system 10 comprises a programmable electronic display device (PEDD) 12, statistics workstation 14a, display interface workstation 14b, and data-store 16. PEDD 12 comprises electronic display board 18 and display board controller 20. Statistics workstation 14a comprises workstation device 22a, operating system 24a, and sport statistics recording program 26. Display interface workstation 14b comprises workstation device 22b, operating system 24b, and intelligent interface program 28. Data-store 16 comprises mass storage devices 30, such as digital disk-drives, containing a plurality of recorded data sources, such as statistical database files (DATABASE 1-DATABASE N) 32. Additional recorded data sources (not shown) are available from the public Internet 34.

PEDD 12 may be any conventional programmable electronic display device such as a sports scoreboard matrix display and controller operatively equipped and enabled to transmit and receive digital data communications and to download display content data files from an external device such as display interface workstation 14b via data communications link 36. In a preferred first embodiment, display board controller 20 embodies the Daktronics® Venus® 7000 Display Controller; the apparatus, processes, functions and characteristics of said preferred first embodiment as described in the Daktronics® Venus® 7000 Engineering Hardware Specification and the Daktronics® Venus® 7000 Engineering Software Specification provide a complete and detailed understanding of the application of said preferred first embodiment and those documents are appended hereto and incorporated in their entirety. In a preferred second embodiment, display board controller 20 embodies the Daktronics® V-Play® Video Controller; the apparatus, processes, functions and characteristics of said preferred second embodiment as described in the Daktronics® V-Play® Video Controller Engineering Hardware Specification and the Daktronics® V-Play® Video Controller Engineering Software Specification provide a complete and detailed understanding of the application of said preferred second embodiment and those documents are appended hereto and incorporated in their entirety. As will be apprehended by those skilled in the art, the preferred embodiments of display board controller 20 are not limiting in scope, since it will be obvious that any display board controller 20, whether commercially available or of custom design and manufacture and operatively capable of performing the uses and functions hereinafter described, also is contemplated.

Statistics workstation 14a embodies any standard and commercially available workstation 22a such as a microcomputer or similar device operatively equipped and enabled to execute operating system 24a and sport statistics recording program 26. Statistics workstation 14a operatively executes operating system 24a, which may be one of several public and commercially available operating systems such as WINDOWS® XP, MACINTOSH® OS, or LINUX® that provide an operating system platform and application support services to operatively execute sport statistics recording program 26 and to provide data communication support services with data store 16 via data communications link 38, with the public Internet 34 via data communications link 40, and with display interface workstation 14b via data communications link 37. Statistics workstation 14a is operatively equipped and enabled to perform data communications including accessing, searching and retrieving statistical database files 32 residing within data store 16 mass storage devices 30 via data communications link 38 and other database files (not shown) residing on the public Internet 34 via data communications link 40, as well as to transmit and receive data files and communications with display interface workstation 14b via data communications link 37.

In a preferred embodiment of statistics workstation 14a, sport statistics recording program 26 comprises the Daktronics® DakStats® 3000 Sport Software; the processes, functions and characteristics of said preferred embodiment as described in the Daktronics® DakStats® 3000 Engineering Software Specification provide a complete and detailed understanding of the application of said preferred embodiment and that document is appended hereto and incorporated in its entirety. As will be apprehended by those skilled in the art, the preferred embodiment of sport statistics recording program 26 is not limiting in scope, since it will be obvious that any sport statistics recording program 26, whether commercially available or of custom design and manufacture and operatively capable of performing the uses and functions hereinafter described, also is contemplated.

Display interface workstation 14b embodies any standard and commercially available workstation 22b operatively equipped and enabled to execute operating system 24b and intelligent interface program 28. Display interface workstation 14b operatively executes operating system 24b, which may be one of several public and commercially available operating systems such as WINDOWS® XP, MACINTOSH® OS, or LINUX® that provide an operating system platform and application support services to operatively execute intelligent interface program 28 and to provide data communications support services with data store 16 via data communications link 38, with the public Internet 34 via data communications link 40, with statistics workstation 14a via data communications link 37, and with PEDD 12 via data communications link 36. Display interface workstation 14b is operatively equipped and enabled to perform data communications including accessing, searching and retrieving statistical database files 32 residing within data store 16 mass storage devices 30 via data communications link 38 and other database files (not shown) residing on the public Internet 34 via data communications link 40, as well as to transmit and receive data files and communications with statistics workstation 14a via data communications link 37 and with PEDD 12 via data communications link 36.

In a preferred embodiment of display interface workstation 14b, intelligent interface program 28 comprises the Daktronics® StatVision® Interface Software; the processes, functions and characteristics of said preferred embodiment as described in the Daktronics® StatVision® Engineering Software Specification provide a complete and detailed understanding of the application of said preferred embodiment and that document is appended hereto and incorporated in its entirety. As will be apprehended by those skilled in the art, the preferred embodiment of intelligent interface program 28 is not limiting in scope, since it will be obvious that any intelligent interface program 28, whether commercially available or of custom design and manufacture and operatively capable of performing the uses and functions hereinafter described, also is contemplated.

Referring now to FIG. 2, which depicts data flow within intelligent interface display system 10, an operator 42 of remote-terminal 44 creates or modifies one or more recorded data source files 45 and uploads recorded data source files 45 via data communications link 46 to data store 16 mass storage devices 30 for storage, such as statistical database files (DATABASE 1-DATABASE N) 32. Those skilled in the art will apprehend that recorded data source files 45 are not limited to statistical database files 32 but may comprise any of various types and formats of digital data files including graphical and textual visual display content data files, text message data files, special effects and animation data files, digital graphics data files, video data files, and similar such data. In a preferred embodiment, statistical database files 32 comprise a plurality of recorded database files that may include game statistics, player statistics, team statistics, season statistics, and career statistics, among others. Statistical database files 32 may be accessed, created and updated by a plurality of statistical database users such as operator 42 at remote-terminal 44 and operator 50 at statistics workstation 14*a*.

Operator 50 operates sport statistics recording program 26 (ref. FIG. 1) running in statistics workstation 14*a*, which operatively executes under control of operating system 24*a* to record statistical data of a sporting contest or game in progress thereby to create, modify or update statistical data relating to a real-time event or activity such as a sporting contest. Sport statistics recording program 26 accesses and updates statistical database files 32 within data store 16 mass storage devices 30 via data communications link 38 to keep statistical data within statistical database files 32 current to the present moment.

Operator 53 operates intelligent interface program 28 (ref. FIG. 1) running in display interface workstation 14*b*, which operatively executes under control of operating system 24*b* and operatively communicates with sport statistics recording program 26 via data communications link 37 to monitor changes in status of real-time data entered and modified by operator 50 of sport statistics recording program 26, which represents changes in the situational current state of a sporting contest or game in progress. Intelligent interface program 28 also operatively interfaces with data store 16 mass storage devices 30 via data communications link 38 as well as with other data stores (not shown) residing on the public Internet 34 via data communication link 40, thereby to search, access and retrieve a plurality of data items 48 in response to changes in the situational current state of a sporting contest or game in progress.

Figure 4:
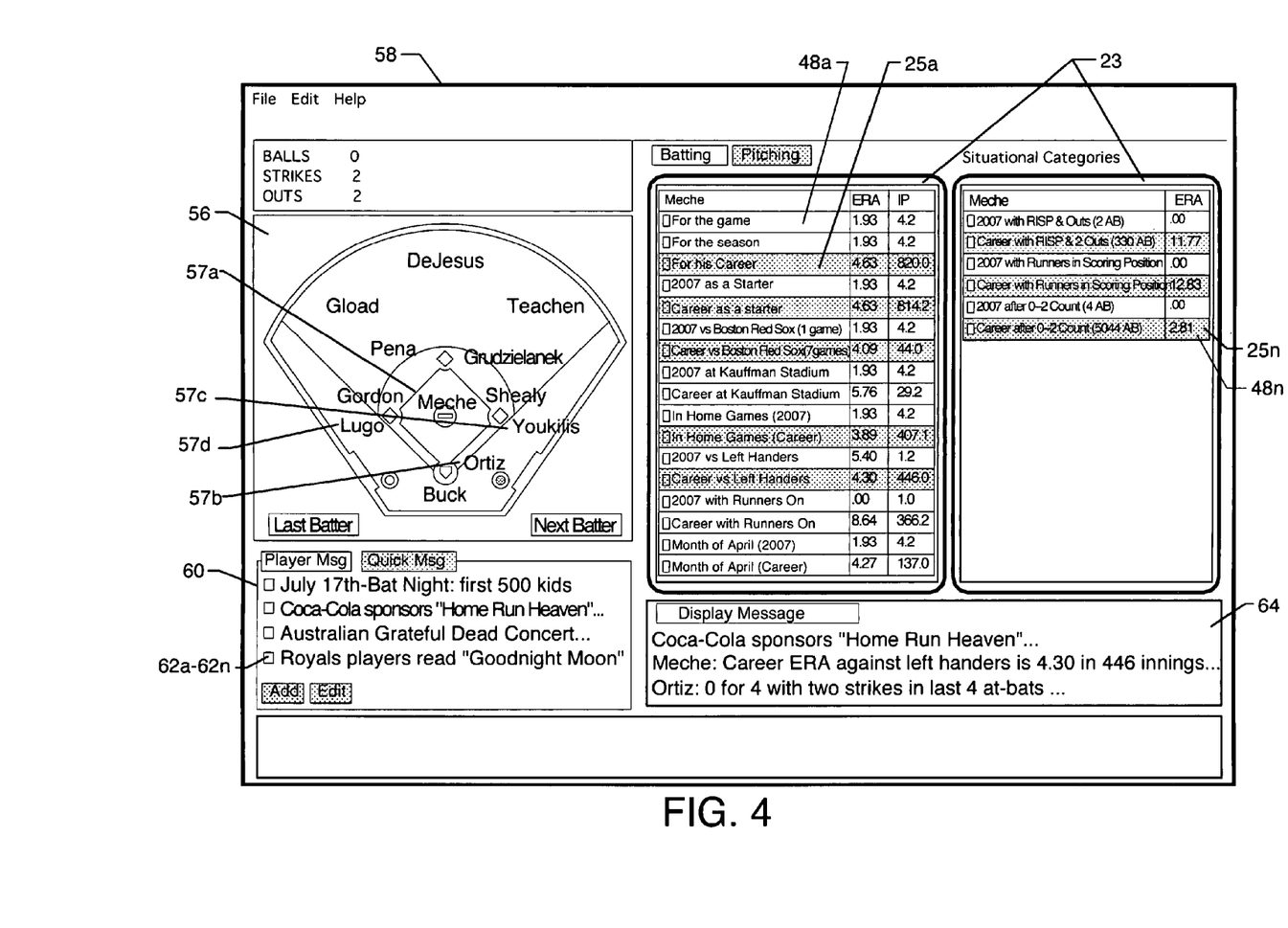
FIG. 4 is a conceptual diagram depicting a graphical user interface (GUI) for the intelligent interface software application program of the present invention; and, FIG. 5 is a simple process flow diagram depicting the mode-of-operation of the intelligent interface software application program of the present invention.

Intelligent interface program 28 accesses recorded data source files 45 including statistical database files 32 within data store 16 mass storage devices 30 via data communications link 38 and additional recorded data source files (not shown) available from the public Internet 34 via data communications link 40, to identify and compile selected data items 48 relevant to a given situational current state of a sporting contest in response to real-time data generated by sport statistics recording program 26 representing said situational current state of a game in progress. Intelligent interface program 28 operatively compiles from a plurality of the aforementioned data sources relevant data items 48 and organizes and prioritizes them for visual presentation within data tables 23 of GUI 58 on display interface workstation 14*b* for review and selection by operator 53. Intelligent interface program 28 further designates recommended data items 25 within data tables 23 that meet or exceed predetermined minimum acceptance criteria or threshold values by highlighting or annotating said recommended data items 25 within data tables 23 to alert operator 53 of recommended data items 25 for display. Operator 53 may select from data tables 23 any one or a plurality of relevant data items 48 within data tables 23 including recommended data items 25 for transmitting to any one or a plurality of PEDD 12 display board controller(s) 20 via data communications link 36 for display on electronic display board(s) 18. Alternatively, operator 53 of display interface workstation 14*b* may elect not to transmit any relevant data items 48 within data tables 23 or recommended data items 25 for display.

Figure 3:
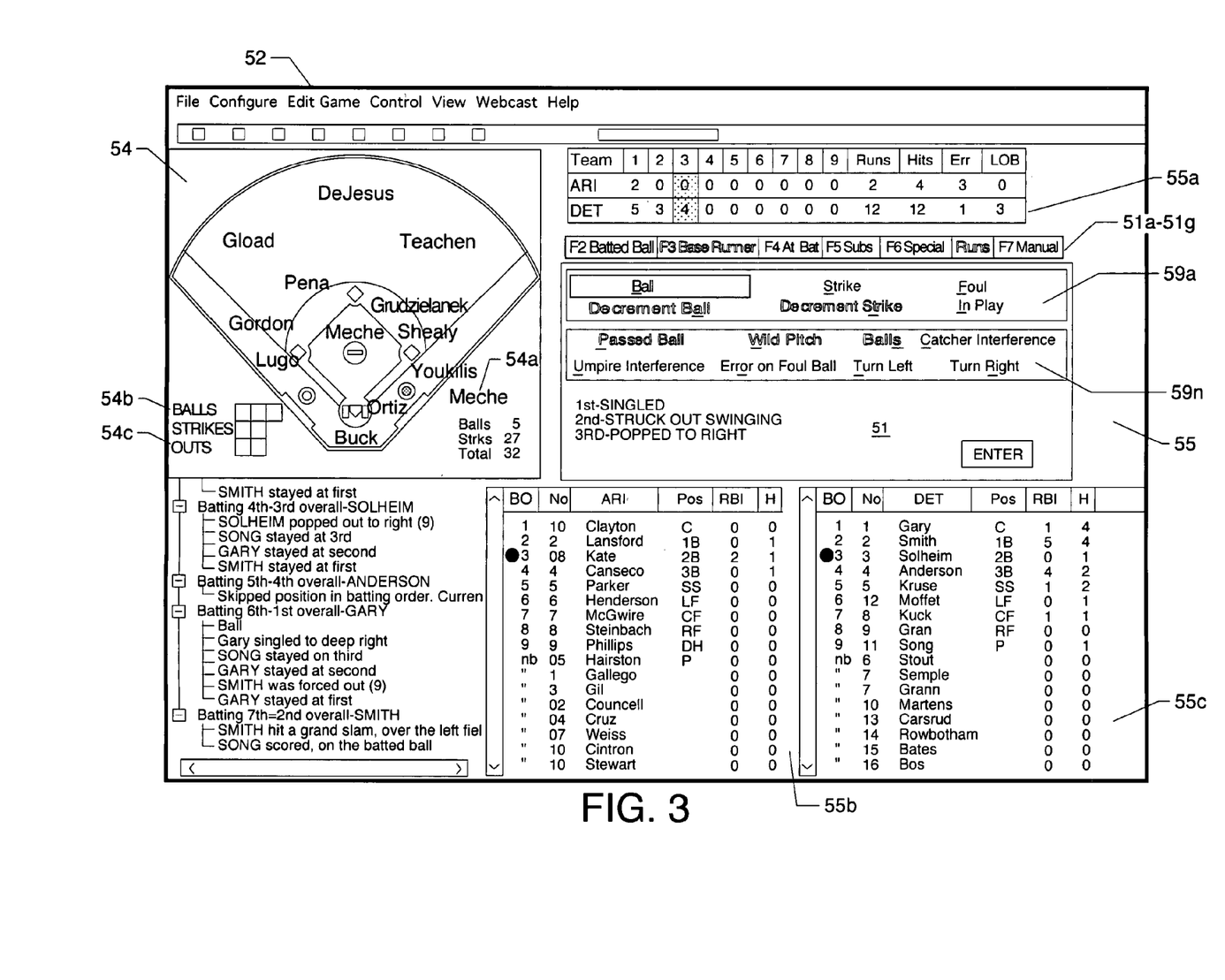
FIG. 3 is a conceptual diagram depicting a graphical user interface (GUI) for a sport statistics recording program.

FIG. 3 depicts graphical user interface (GUI) 52 of sport statistics recording program 26 operating within statistics workstation 14*a*. Field 54 of GUI 52 depicts a graphical representation of a baseball game in progress being statistically recorded by operator 50 of sport statistics recording program 26. The names of players on each baseball team are shown occupying positions (e.g., pitcher, batter, catcher, infielders, outfielders) on the graphical representation within field 54 of the actual player positions on the playing field of a game in progress, along with other status items corresponding to the situational current state of the game in progress including the total number of balls and strikes thrown by the current pitcher at sub-field 54*a*, the current number of balls and strikes thrown against the current batter at sub-field 54*b* and the current number of outs at sub-field 54*c*. Field 55 of GUI 52 depicts the control interface by which operator 50 of sport statistics recording program 26 records the situational current state of a sporting contest or game in progress as represented by the game scoreboard at sub-field 55*a*, the home team statistics at sub-field 55*b* and the visiting team statistics at sub-field 55*c*. Field 51 of GUI 52 depicts a graphical representation of operator controls, whereby operator 50 of sport statistics recording program 26 may record a situational current state of a sporting contest or game in progress by selecting the appropriate control sub-menu or tab from control sub-menus 51*a*-51*g* and in turn may select appropriate values from control sub-fields 59*a*-59*n* within control sub-menus 51*a*-51*g*.

FIG. 4 depicts graphical user interface (GUI) 58 of intelligent interface program 28 operating within display interface workstation 14*b*. Intelligent interface program 28 operatively and automatically monitors the situational current state of a sporting contest or game in progress being recorded by operator 50 of sport statistics recording program 26 at statistics workstation 14*a* via data communications link 37. Accordingly, field 56 of GUI 58 depicts the graphical representation of a baseball game in progress being statistically recorded by operator 50 of sport statistics recording program 26. Hence, the current state of a game in progress as shown in the example depicted in field 54 of GUI 52 (ref. FIG. 3) of statistics workstation 14*a* is duplicated in field 56 of GUI 58 of display interface workstation 14*b*. In the example shown, a pitcher 57*a* (c.f., Meche) is depicted ahead in strikes against a left-handed batter 57*b* (c.f., Ortiz) with runners 57*c*, 57*d* (c.f., Youkilis, Lugo) on base. Based on the situational current state of the sporting contest or game in progress, intelligent interface program 28 presents relevant data items 48*a*-48*n* within data tables 23 of GUI 58 for presentation to operator 53. Additionally, intelligent interface program 28 designates a sub-set of data items 48*a*-48*n* that meets or exceeds predetermined minimum acceptance criteria or threshold values as recommended data items 25*a*-25*n* for display by highlighting or annotating those data items 25*a*-25*n* within data tables 23 thereby to alert operator 53 of suitability for display.

Intelligent interface program 28 GUI 58 provides means operative and efficacious for operator 53 instantly to select and transmit any one or a plurality of relevant data items 48*a*-48*n*, which may include recommended data items 25*a*-25*n*, to PEDD 12 display board controller(s) 20 via data communications link 36 for display on electronic display board(s) 18. Field 60 of GUI 58 depicts a graphical representation of player and text messages 62*a*-62*n* that may be selected for display and transmitted by operator 53 in the same manner as data items 48*a*-48*n*.

MODE OF OPERATION

Figure 5:
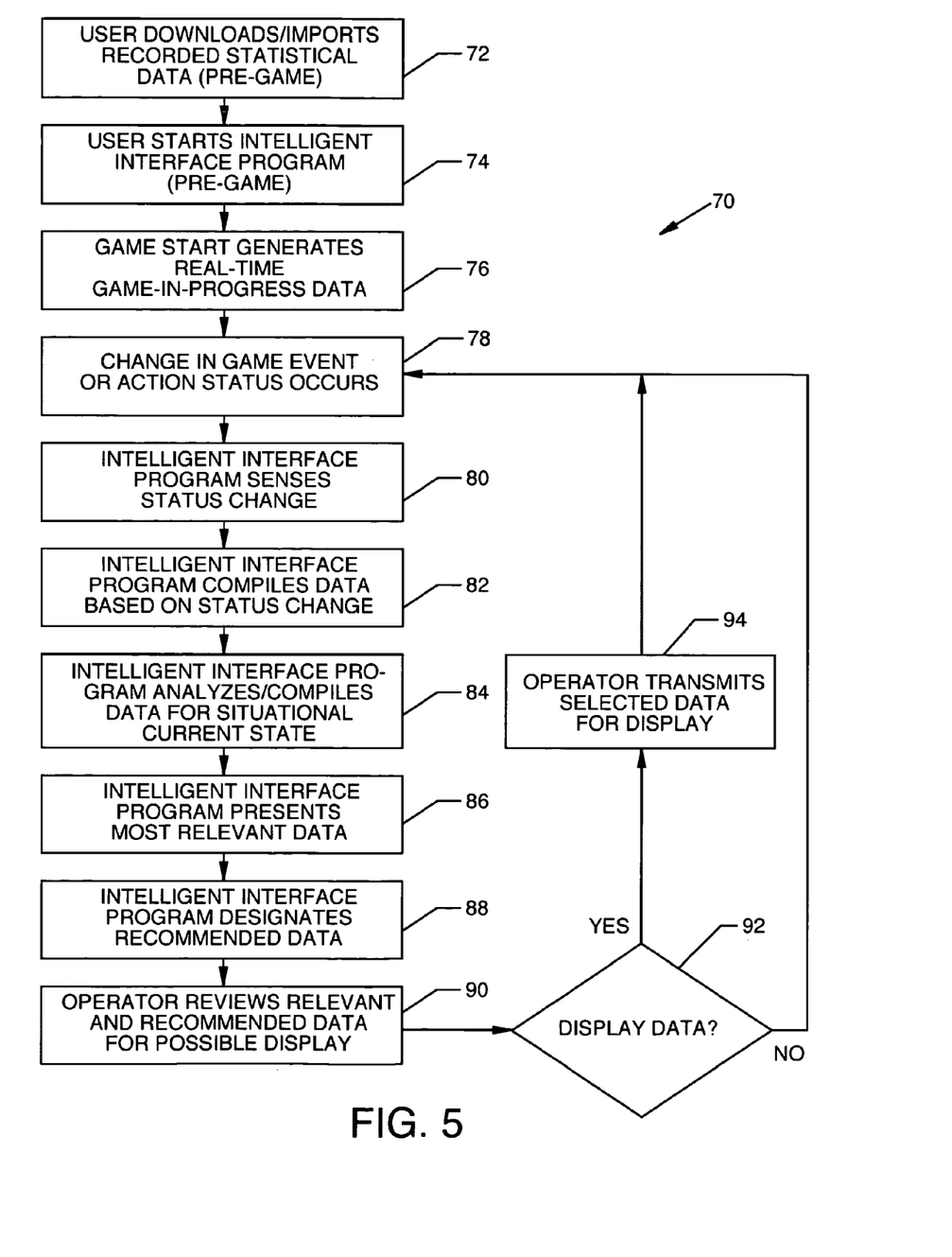

With reference to FIG. 5, the mode of operation is now described wherein all reference numerals correspond to those elements previously described. FIG. 5 is a simple process flow diagram showing the various operating functional stages 72 through 94 depicting the basic mode of operation 70 by which an operator 53 of intelligent interface program 28 makes use of the present invention.

Mode of operation 70 is initiated prior to the start of a real-time event or activity such as a sporting contest when an operator 42 at remote-terminal 44 (ref. FIG. 2), or operator 50 at statistics workstation 14a, downloads or imports recorded data source files 45 to data store 16 mass storage devices 30, at stage 72. Downloaded and imported recorded data source files 45 may include, but are not limited to, statistical database files 32 such as career statistics database files containing statistical data for the players of one or more teams, team statistics database files containing statistical data for one or more teams involved in a forthcoming sporting contest, and game statistics database files containing statistical data relating to events and outcomes of previous contests between players and teams. This type of data typically is generated by a sporting team or league administration using a sport statistical recording software program such as Daktronics® DakStats® Sport Software. Additionally, downloaded and imported recorded data source files 45 may include other data source files (not shown) available in the public domain or provided by commercial service bureaus including statistical data sources available on the public Internet 34 such as Major League Baseball, Elias Sports Bureau, Associated Press (AP) and United Press International (UPI), on-line sports newsmagazines, team organization press guides, and similar such sources.

Prior to the start of play, operator 50 of sport statistics recording program 26 running in statistics workstation 14a enters pregame data such as names of the opposing teams, the batting line-ups, starting pitchers for each team, lead batters and so forth. Once the pregame data for a forthcoming sporting contest has been entered, operator 50 starts sport statistics recording program 26, at stage 74. In a preferred first embodiment, intelligent interface program 28 automatically starts and initiates execution when sport statistics recording program 26 is started. In a preferred second embodiment, intelligent interface program 28 may be separately and manually started by operator 53 running in display interface workstation 14b and initiate execution at any time after sport statistics recording program 26 is started.

At game start, stage 76, operator 50 changes the operating status of sport statistics recording program 26 from pregame mode (inactive) to game-in-progress mode (active) using operative software controls provided by GUI 52. Game start generates initial game-in-progress data that is concurrently monitored by intelligent interface program 28 via data communications link 37, which first acquires real-time data relating to the initial situational current state including players actively in play, the starting pitcher and the lead-off batter. The change in operating status engenders initial game-in-progress data that triggers intelligent interface program 28 automatically to compile and present relevant data items 48a-48n within data tables 23 of GUI 58 (ref. FIG. 4) corresponding to the situational current state of the sporting contest and which include in this example selected statistical data relating to the match-up between the starting pitcher and lead-off batter.

Thereafter, any statistically significant action or change in the baseball game recorded by operator 50 of sport statistics recording program 26 generates real-time data representing a change in the situational current state of the game, at stage 78. Operator 50 continually monitors the game action and operatively enters any changes to the situational current state of the game accordingly, using software controls provided by sport statistics recording program 26 GUI 52 (ref FIG. 3). Intelligent interface program 28 operatively and intelligently interfaces with sport statistics recording program 26 via data communications link 37 to automatically monitor and sense changes in the situational current state of the game as represented by real-time data entered and modified by operator 50.

By way of further example, a starting pitcher in a baseball game throws a first pitch to a lead-off batter. The first pitch may be a ball or strike, or may be hit, or may be tipped foul, or may be a passed ball. Additionally, the first pitch may be a fastball, curveball, slider, or knuckleball, thrown inside or outside, thrown high or low. Regardless of the characteristics of the first pitch, operator 50 of sport statistics recording program 26 records the action, thus creating real-time data that represents a change in the situational current state of the game in progress. Intelligent interface program 28 senses the change in the situational current state of the game as recorded by sport statistics recording program 26, at stage 80.

In response, intelligent interface program 28 again searches through recorded data source files 45 in data store 16 mass storage devices 30 to compile anew data items 48 corresponding to the new situational current state of the game, at stage 82. Once the data items 48 for the new situational current state have been compiled and uploaded, intelligent interface program 28 analyses, organizes and prioritizes the compiled data based on the situational current state, at stage 84.

Next, intelligent interface program 28 presents the most relevant data items 48a-48n within data tables 23 of GUI 58 of intelligent interface program 28 for review by operator 53, at stage 86. Advantageously, all relevant data items 48a-48n are shown within a single field, such as a computer monitor screen, for review and selection by operator 53. Also advantageously, the compiled relevant data items 48a-48n are presented as line items listed within a plurality of data tables 23 (ref. FIG. 4) with different categories of data separated within informational fields or designated by tabs. Only the most relevant data items 48a-48n relating to the situational current state are shown. However, less relevant and lower priority data remains available as needed by operator 53, who may select from among a plurality of desired data tables 23 by clicking on a tab or selection box (not shown) to activate the table and then may select any one or a plurality of less relevant data items within selected data tables 23 for reference, review or display.

Once intelligent interface program 28 identifies, compiles, organizes, prioritizes and presents the relevant data items 48a-48n, it recommends a sub-set of the most appropriate data items 25a-25n contained therein for display, at stage 88. Intelligent interface program 28 recommends only those data items 25a-25n within data tables 23 that meet or exceed minimum acceptance criteria or threshold values as heretofore described. Referring again to FIG. 4, data items 25a-25n shown in shadow fill indicate data items recommended for display. Shadow fill is used for purposes of illustration within this document; however, the technique also might be employed for producing printed hardcopy of data tables 23. On an actual display interface workstation 14b running intelligent interface program 28, recommended data items 25a-25n shown within data tables 23 of GUI 58 would be shown highlighted or would be indicated by a different color as opposed to using shadow fill.

Operator 53 then reviews the relevant data items 48a-48n compiled, presented and recommended by intelligent interface program 28 within data tables 23 for the most interesting and significant items including recommended data items 25a-25n, at stage 90. Operator 53 next decides whether or not to transmit any relevant data items 48a-48n, which may include recommended data items 25a-25n, to any one or a plurality of electronic display board(s) 18 for display based on the situational current state, which may be static for the present moment or may be pending immediate change, at stage 92.

Upon deciding to transmit data for display, operator 53 then selects any one or a plurality of relevant data items 48a-48n, which may include recommended data items 25a-25n, from data tables 23 using simple software controls provided within GUI 58 of intelligent interface program 28, such as by clicking and dragging relevant data items 48a-48n to display transmit field 64, or by checking a checkbox and clicking on a 'DISPLAY' command button (not shown). Selected relevant data items 48a-48n are transmitted instantly to PEDD 12 display board controller(s) 20 via data communications link 36 and immediately displayed on electronic display board(s) 18 for viewing, at stage 94. Operator 53 may select and transmit for display as many data items 48 as desired until the situational current state once again changes, at stage 78, causing intelligent interface program 28 to sense the change and initiate a new cycle of searching, identifying, compiling, prioritizing, presenting and recommending relevant data items for display.

Various modifications can be made to the present invention without departing from the apparent scope thereof.

What is claimed is:

1. A programmable electronic display system, comprising:
   an electronic display board;
   a display board controller;
   at least one digital data storage device for storing one or more recorded data source files;
   a statistics workstation;
   a statistical data recording software application program executable on the statistics workstation;
   a display interface workstation operatively coupled to the statistics workstation and the display board controller for communication therebetween; and
   an intelligent interface software application program executable on the display interface workstation;
   wherein said intelligent interface software application program automatically compiles selected data items from at least one of said one or more recorded data source files stored in said digital data storage device relevant to real-time data generated by said statistical data recording software application program and automatically presents said compiled selected data items for review, selection and transmittal by an operator of said electronic display board to said display board controller for display.

2. The programmable electronic display system of claim 1, wherein said electronic display board comprises a matrix-type electronic display board.

3. The programmable electronic display system of claim 1, wherein said electronic display board comprises a video-type electronic display board.

4. The programmable electronic display system of claim 1, wherein said display board controller embodies any device capable of receiving said data items from said intelligent interface software application program and displaying said data items on said electronic display board.

5. The programmable electronic display system of claim 1, wherein said statistical data recording software comprises any statistical data recording software capable of interfacing with said intelligent interface software application program.

6. The programmable electronic display system of claim 1, wherein said intelligent interface software application program comprises any intelligent interface software application program capable of interfacing with said statistical data recording software application program and said digital data storage device.

7. A non-transitory machine-readable medium with instructions coded thereon, the instructions when executed by a processor are operable to cause an intelligent interface software application program, to:
   interface with a statistical data recording software application program that generates data representing a given real-time situational current state of an event or activity;
   interface with at least one digital data storage means for storing at least one recorded data source file containing at least one data item;
   receive predetermined selection criteria input by an operator using software controls;
   intelligently monitor real-time data generated by said statistical data recording software application program; and
   intelligently process said recorded data source files to identify, select and compile at least one data item;
   wherein said intelligent interface software application program operatively processes said recorded data source files to automatically identify, select, and compile a plurality of data items relevant to said data representing said real-time situational current state generated by said statistical data recording software application program, and to recommend for selection and display one or more of the plurality of data items that is most appropriate to the real-time situational current state based on the predetermined selection criteria.

8. The machine-readable medium of claim 7, wherein said intelligent interface software application program comprises any intelligent interface software capable of interfacing with said statistical data recording software application program and with said digital data storage means said data source files.

9. The machine-readable medium of claim 7, wherein said statistical data recording software application program comprises any statistical data recording software capable of generating said data representing said a given situational current state of a real-time event or activity and also capable of interfacing with said intelligent interface software application program.

10. The machine-readable medium of claim 7, wherein said data representing said a given situational current state of a real-time event or activity represents said a given situational current state of a real-time sporting contest event or activity.

11. The machine-readable medium of claim 7, wherein said data representing said a given situational current state of said real-time event or activity represents said a given situational current state of any said real-time event or activity that can be represented by said statistical data recording software application program.

12. The machine-readable medium of claim 11, wherein said digital data storage means for storing at least one recorded data source file containing at least one said data item embodies at least one disk-drive mass storage device.

13. The machine-readable medium of claim 12, wherein said at least one recorded data source file comprises at least one statistical database source file.

14. The machine-readable medium of claim 12, wherein said at least one recorded data source file comprises at least one visual display content source file.

15. The machine-readable medium of claim 14, wherein said at least one visual display content source file may be any of a selection of said at least one visual display content source file comprising:
- a digital graphical source file; or
- a digital textual source file; or
- a digital video source file.

16. A programmable electronic display system, comprising:
- an electronic display board;
- a display board controller;
- at least one digital data storage device for storing one or more recorded data source files;
- a statistics workstation;
- a statistical data recording software application program executable on the statistics workstation and configured to generate real-time data related to a real-time event or activity;
- a display interface workstation operatively coupled to the statistics workstation and the display board controller for communication therebetween;
- an intelligent interface software application program executable on the display interface workstation and configured to monitor said generated real-time data and to detect changes in a situational current state of said real-time event or activity;
- a graphical user interface associated with said statistical data recording software application program; and
- one or more controls configured to receive predetermined selection criteria for automatically providing a recommendation related to the situational current state of said real-time event or activity;
- wherein said intelligent interface software application program, upon detecting changes in said situational current state, automatically identifies and compiles a plurality of data items from at least one of said one or more recorded data source files stored in said digital data storage device relevant to said real-time data generated by said statistical data recording software application program and automatically recommends, by presentation on said graphical user interface, one or more of the plurality of data items that is most appropriate to the situational current state, based on the predetermined selection criteria, for review, selection and transmittal by an operator of said electronic display board to said display board controller for display.

17. The programmable electronic display system of claim 16, wherein said compiled selected data items include one or more of statistical data, text messages, visual digital graphics, and textual digital graphics.

18. The programmable electronic display system of claim 16, wherein said intelligent interface software application program provides an editing function that allows said operator of said electronic display board to edit said compiled selected data items presented on said graphical user interface.

19. The programmable electronic display system of claim 16, wherein all of said compiled selected data items are presented to said operator in a single field.

* * * * *